US006916548B2

(12) United States Patent
Murschall et al.

(10) Patent No.: US 6,916,548 B2
(45) Date of Patent: Jul. 12, 2005

(54) WHITE, HIGH-GLOSS, POLYESTER FILM CONTAINING CYCLO-OLEFIN COPOLYMERS (COC), A METHOD FOR THE PRODUCTION THEREOF AND THE USE OF THE SAME

(75) Inventors: Ursula Murschall, Nierstein (DE); Cynthia Bennett, Alzey (DE); Ulrich Kern, Ingelheim (DE); Herbert Peiffer, Mainz (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

(21) Appl. No.: 10/296,037

(22) PCT Filed: May 17, 2001

(86) PCT No.: PCT/EP01/05608

§ 371 (c)(1),
(2), (4) Date: Nov. 20, 2002

(87) PCT Pub. No.: WO01/92012

PCT Pub. Date: Dec. 6, 2001

(65) Prior Publication Data

US 2003/0170476 A1 Sep. 11, 2003

(30) Foreign Application Priority Data

May 26, 2000 (DE) .......................................... 100 26 177

(51) Int. Cl.[7] .......................... B32B 27/08; B32B 27/18; B32B 27/32; B32B 27/36; B32B 31/30
(52) U.S. Cl. ...................... 428/480; 428/483; 428/910; 525/165; 525/173; 525/174; 525/177; 264/288.4; 264/290.2
(58) Field of Search ................................. 428/480, 483, 428/910; 525/165, 173, 174, 177; 264/288.4, 290.2

(56) References Cited

U.S. PATENT DOCUMENTS

| | | | | | |
|---|---|---|---|---|---|
| 4,614,778 | A | * | 9/1986 | Kajiura et al. ............... | 526/281 |
| 5,179,171 | A | * | 1/1993 | Minami et al. .............. | 525/288 |
| 5,843,578 | A | * | 12/1998 | Sasaki et al. ................ | 428/483 |
| 5,869,586 | A | * | 2/1999 | Riedel et al. ................ | 526/170 |
| 6,017,616 | A | * | 1/2000 | Kochem et al. ............. | 428/220 |
| 6,326,431 | B1 | * | 12/2001 | Peiffer et al. ................ | 525/177 |
| 2001/0029274 | A1 | * | 10/2001 | Murschall et al. ............. | 524/93 |
| 2001/0031802 | A1 | * | 10/2001 | Murschall et al. .............. | 524/1 |
| 2002/0115760 | A1 | * | 8/2002 | Murschall et al. ........... | 524/128 |
| 2002/0160215 | A1 | * | 10/2002 | Peiffer et al. ................ | 428/480 |
| 2003/0180560 | A1 | * | 9/2003 | Peiffer et al. ................ | 428/480 |
| 2003/0224190 | A1 | * | 12/2003 | Peiffer et al. ................ | 428/480 |
| 2003/0224191 | A1 | * | 12/2003 | Peiffer et al. ................ | 428/480 |

FOREIGN PATENT DOCUMENTS

| | | |
|---|---|---|
| DE | 0 156 464 | 11/1904 |
| DE | 109 224 | 7/1973 |
| DE | 2 353 347 | 5/1974 |
| DE | 237 070 A3 | 7/1986 |
| DE | 195 40 277 A1 | 5/1996 |
| EP | 0 283 164 A2 | 9/1988 |
| EP | 0 300 060 A1 | 1/1989 |
| EP | 0 360 201 A2 | 3/1990 |
| EP | 0 407 870 A2 | 1/1991 |
| EP | 0 485 893 A1 | 5/1992 |
| EP | 0 503 422 A1 | 9/1992 |
| EP | 0 602 964 A1 | 6/1994 |
| EP | 0 786 495 A2 | 7/1997 |
| EP | 0 795 399 A1 | 9/1997 |
| EP | 1 068 949 A1 | 1/2001 |
| JP | 05-009319 | * 1/1993 |
| JP | 05009319 A | 1/1993 |
| JP | 05-140349 | * 6/1993 |
| JP | 05-230253 | * 9/1993 |
| JP | 11-035717 | * 2/1999 |

OTHER PUBLICATIONS

Schimtz, Peter et al., "Films." Ullmann's Encyclopedia of Industrial Chemistry, 5th Ed., vol. A11 (1988), pp. 85–95, 108–110.*

* cited by examiner

*Primary Examiner*—Vivian Chen
(74) *Attorney, Agent, or Firm*—ProPat, L.L.C.

(57) ABSTRACT

The invention relates to biaxially orientated, co-extruded polyester films, which have at least one base layer that contains a thermoplastic polyester, preferably polyethylene terephthalate and approx. 2 to 60 wt.-% of a cycloolefin copolymer that is preferably composed of norbornene and ethylene units and which have at least one cover layer that is devoid of a COC and which optionally have additional cover or intermediate layers and can contain conventional additives such as stabilisers and anti-blocking agents. Said films are characterized in particular by a degree of whiteness>70%, an opacity>55% and a gloss, (at least on one side)>100 and are therefore suitable for numerous industrial applications. During the production of the films in accordance with the co-extrusion process, up to 70 wt.-% of reclaimed product can be used, without having a noticeable negative effect on the physical properties of the film.

15 Claims, No Drawings

WHITE, HIGH-GLOSS, POLYESTER FILM CONTAINING CYCLO-OLEFIN COPOLYMERS (COC), A METHOD FOR THE PRODUCTION THEREOF AND THE USE OF THE SAME

The present invention relates to a white, high-gloss, biaxially oriented, coextruded polyester film, which is composed of at least one base layer and of at least one outer layer, the base layer comprising a polyester and a cycloolefin copolymer (COC). The invention further relates to the use of the polyester film and to a process for the production.

BACKGROUND OF THE INVENTION

White, biaxially oriented polyester films are known from the prior art.

DE-A 2 353 347 describes a process for producing a milky polyester film having one or more layers, which comprises preparing a mixture of particles of a linear polyester with from 3 to 27% by weight of a homopolymer or copolymer of ethylene or propylene, extruding the mixture as a film, quenching the film and biaxially orienting the same by stretching in directions running perpendicularly to one another, and heat-setting the film. A disadvantage of the process is that regenerated material produced during the production of the film (essentially a mixture of polyester and ethylene or propylene copolymer) cannot be reused without discoloration or yellowing of the film. This makes the process uneconomic. In addition, the film has high roughness values, giving it a very matt appearance (very low gloss), and this is undesirable for many applications.

EP-A 0 300 060 describes a single-layer polyester film which comprises, besides polyethylene terephthalate, from 3 to 40% by weight of a crystalline propylene polymer and from 0.001 to 3% by weight of a surface-active substance. The effect of the surface-active substance is to increase the number of vacuoles in the film and at the same time to reduce their size to the extent desired. This achieves higher opacity and lower density of the film. A disadvantage of the film continues to be that regenerated material produced during the production of the film (essentially a mixture of polyester and propylene homopolymer) cannot be reused without yellowing of the film. However, this makes the process uneconomic. In addition, the film has high roughness values, giving it a very matt appearance (very low gloss), and this is undesirable for many applications.

EP-A 0 360 201 describes a polyester film having at least two layers, comprising a base layer with fine vacuoles, the density of which is from 0.4 to 1.3 kg/dm$^3$, and at least one outer layer, the density of which is greater than 1.3 kg/dm$^3$. The vacuoles are achieved by adding from 4 to 30% by weight of a crystalline propylene polymer, followed by biaxial stretching of the film. As a result of adding the outer layer the ease of production of the film is improved (no streaking on the film surface), the surface tension is increased and the roughness of the laminated surface can be reduced. A disadvantage still present is that regenerated material produced during the production of the film (essentially a mixture of polyester and propylene homopolymer) cannot be reused without yellowing of the film. This makes the process uneconomic. In addition, the films listed in the examples have high roughness values, giving them a matt appearance (low gloss), and this is undesirable for many applications.

EP-A 0 795 399 describes a polyester film having at least two layers and comprising a base layer with fine vacuoles, the density of which is from 0.4 to 1.3 kg/dm$^3$, and having at least one outer layer, the density of which is greater than 1.3 kg/dm$^3$. The vacuoles are produced by adding from 5 to 45% by weight of a thermoplastic polymer to the polyester in the base layer, followed by biaxial stretching of the film. The thermoplastic polymers used are, inter alia, polypropylene, polyethylene, polymethylpentene, polystyrene or polycarbonate, and the preferred thermoplastic polymer is polypropylene. As a result of adding the outer layer the ease of production of the film is improved (no streaking on the film surface), the surface tension is increased and the roughness of the laminated surface can be matched to prevailing requirements. Further modification of the film in the base layer and/or in the outer layers, using white pigments (generally TiO$_2$) and/or using optical brighteners, permits the properties of the film to be matched to the prevailing requirements of the application. A continuing disadvantage is that regenerated material produced during the production of the film (essentially a mixture of polyester and the added polymer) cannot be reused without undefined changes in the color of the film, this being undesirable in many applications. This makes the process uneconomic. In addition, the films listed in the examples have high roughness values, giving them a matt appearance (low gloss), and this is undesirable for many applications.

DE-A 195 40 277 describes a polyester film having one or more layers, which comprises a base layer with fine vacuoles, the density of which is from 0.6 to 1.3 kg/dm$^3$, and which has a planar birefringence of from –0.02 to 0.04. The vacuoles are produced by adding from 3 to 40% by weight of a thermoplastic resin to the polyester in the base layer, followed by biaxial stretching of the film. The thermoplastic resins used are, inter alia, polypropylene, polyethylene, polymethylpentene, cyclic olefin polymers, polyacrylic resins, polystyrene or polycarbonate, and preferred polymers are polypropylene and polystyrene. Maintaining the stated limits for the birefringence of the film gives the claimed film in particular a superior tear strength and superior isotropic properties. A continuing disadvantage is that regenerated material produced during the production of the film cannot be reused without undefined changes in the color of the film, this being undesirable for many applications. However, this makes the process uneconomic. In addition, the films listed in the examples have high roughness values, giving them a matt appearance (low gloss), and this is undesirable for many applications.

It was therefore the object of the present invention to provide a white polyester film which in particular has very high gloss and improved ease of production, i.e. low production costs, but without the disadvantageous properties mentioned above. In particular, it should be possible for regrind arising directly during the production process to be reused, preferably at a concentration of from 10 to 70% by weight, based on the total weight of the film, without any significant resulant adverse effect on the physical properties of the film. In particular, the addition of regrind should not cause discoloration or yellowing of the film.

BRIEF DESCRIPTION OF THE INVENTION

The object is achieved by a white, high-gloss, biaxially oriented, coextruded polyester film in the thickness range which is preferably from 4 to 500 μm, composed of at least one base layer and of at least one outer layer, where the base layer also comprises a cycloolefin copolymer (COC). The concentration of the COC is preferably from 2 to 60% by weight, based on the weight of the base layer. The glass transition temperature of the cycloolefin copolymer (COC)

is preferably in the range from 70 to 270° C., and at least one surface of the film (outer layer) has a gloss value (measurement angle 20°) greater than 100.

DETAILED OF THE INVENTION

High surface gloss means that the gloss is>100 (DIN 67530 at a measurement angle of 20°), preferably >120 and in particular >130.

For the purposes of the present invention, a white polyester film is a film whose whiteness is above 70%, preferably above 75%, particularly preferably above 80%. The opacity of the film of the invention is moreover above 55%, preferably above 60% and particularly preferably above 65%.

To achieve the desired whiteness of the film of the invention the proportion of the cycloolefin copolymer (COC) in the base layer should be greater than 2%. If, on the other hand, the cycloolefin copolymer (COC) content is greater than 60%, the production of the film may become uneconomic, since the orientation process becomes unreliable.

It is also preferable for the glass transition temperature of the cycloolefin copolymer (COC) used to be above 70° C. If this is not the case (if the glass transition temperature is below 70° C.), the polymer mixture is sometimes more difficult to process (more difficult to extrude), the desired whiteness is sometimes no longer achieved and the regenerated material used gives a film with a tendency toward increased yellowing. If, on the other hand, the glass transition temperature of the selected cycloolefin copolymer (COC) is above 270° C., the polymer mixture will no longer be capable of sufficiently homogeneous dispersion in the extruder. The result is a film with non-uniform properties.

In the preferred embodiment of the film of the invention the glass transition temperature of the COCs used is in the range from 90 to 250° C., and in the particularly preferred embodiment it is in the range from 110 to 220° C.

Surprisingly, it has been found that adding a cycloolefin copolymer (COC) in the manner described above can produce a white, opaque and glossy film.

The whiteness and the opacity of the film can be precisely controlled and matched to the prevailing requirements as a function of the amount and type of the cycloolefin copolymer (COC) added. It is possible by this means to dispense to a considerable extent with the use of other customary whiteners and opacifiers. It was also highly surprising that the surface roughness of the film is significantly lower, and therefore the gloss of the film is significantly higher, than in comparable films of the prior art. The additional effect—that the regenerated material, unlike the polymeric additives of the prior art, shows no tendency to cause yellowing—was entirely surprising.

None of these features described was foreseeable, especially since although it is clear that COCs are substantially incompatible with polyethylene terephthalate, the preferred polyester it is known that they are oriented with similar stretching ratios and stretching temperatures to those used for polyethylene terephthalate. In these circumstances the skilled worker would have expected that a white and opaque film with a high gloss cannot be produced under the pro conditions of the invention.

In particular in the preferred and particularly preferred embodiments the film of the invention has high and, respectively, particularly high whiteness and high and, respectively, particularly high opacity in combination with high surface gloss on at least one surface of the film, and the change in color of the film as a result of adding regenerated material remains extremely small.

The film of the invention has more than one layer. Embodiments having more than one layer have at least two layers and always comprise the COC-containing base layer and at least one other outer layer. In one preferred embodiment the COC-containing layer forms the base layer of the film with at least one outer layer and preferably with outer layers on both sides, and (an) intermediate layer(s) may, if desired, be present on one or both sides. The film then has the layer structure A-B-C, for example, where B is the base layer and A and C are the outer layers, which may be identical or different. In another preferred embodiment the COC-containing layer also forms an intermediate layer of the film having more than one layer. Other embodiments with COC-containing intermediate layers have a five-layer structure and have COC-containing intermediate layers on both sides, besides the COC-containing base layer. In another embodiment the COC-containing layer may form an outer layer on one side of the base layer or intermediate layer, in addition to the base layer. For the purposes of the present invention, the base layer is that layer which preferably makes up from more 50 to 99.5%, from 60 to 95%, of the total film thickness. The outer layers are the layers which form the outermost layers of the film.

The COC-containing base layer of the film of the invention comprises a thermoplastic polyester, preferably a homopolyester, a COC, and also, if desired, other additives, in each case in effective amounts. This layer generally comprises at least from 20 to 98% by weight, preferably from 40 to 98% by weight, in particular from 70 to 98% by weight, of thermoplastic polyester, based on the weight of the layer.

Suitable thermoplastic polymers for the base layer are preferably polyesters made from ethylene glycol and terephthalic acid (=polyethylene terephthalate, PET), from ethylene glycol and naphthalene-2,6-dicarboxylic acid (=polyethylene 2,6-naphthalate, PEN), from 1,4-bishydroxymethylcyclohexane and terephthalic acid (=poly-1,4-cyclohexanedimethylene terephthalate, PCDT) or else made from ethylene glycol, naphthalene-2,6-dicarboxylic acid and biphenyl-4,4'-dicarboxylic acid (=polyethylene 2,6-naphthalate bibenzoate, PENBB). Particular preference is given to polyesters which are composed of at least 90 mol %, preferably at least 95 mol %, of ethylene glycol units and terephthalic acid units or ethylene glycol units and naphthalene-2,6-dicarboxylic acid units. The remaining monomer units are derived from other aliphatic, cycloaliphatic or aromatic diols and, respectively, dicarboxylic acids, as may also be present in layer A (A=outer layer 1) and/or in layer C (C=outer layer 2) of a multilayerd ABC (B=base layer) film, for example.

Examples of other suitable aliphatic diols are diethylene glycol, triethylene glycol, aliphatic glycols of the formula HO—$(CH_2)_n$—OH, where n is an integer from 3 to 6 (in particular 1,3-propanediol, 1,4-butanediol, 1,5-pentanediol and 1,6-hexanediol) or branched aliphatic glycols having up to 6 carbon atoms. Among the cycloaliphatic diols, mention should be made of cyclohexanediols (in particular 1,4-cyclohexanediol). Other suitable aromatic diols are those, for example, of the formula HO—$C_6H_4$—X—$C_6H_4$—OH, where X is —$CH_2$—, —$C(CH_3)_2$—, —$C(CF_3)_2$—, —O—, —S— or —$SO_2$—. Bisphenols of the formula HO—$C_6H_4$—$C_6H_4$—OH are also highly suitable.

Other preferred aromatic dicarboxylic acids are benzenedicarboxylic acids, naphthalenedicarboxylic acids (such as naphthalene-1,4- or -1,6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene-4,4'-dicarboxylic acid) and stilbene-x,x'-dicarboxylic acids. Among the cycloaliphatic dicarboxylic acids mention should be made of cyclohexanedicarboxylic acids (in particular cyclohexane-1,4-dicarboxylic acid). Among the aliphatic dicarboxylic acids the ($C_3$-$C_{19}$)-alkanedioic acids are particularly suitable, where the alkane moiety may be straight-chain or branched.

The polyesters to be used according to the invention may, for example, be prepared by the transesterification process. The starting materials here are dicarboxylic esters and diols, and these are reacted using the usual transesterification catalysts, such as salts of zinc, of calcium, of lithium, of magnesium or of manganese. The intermediates are then polycondensed in the presence of typical polycondensation catalysts, such as antimony trioxide or titanium salts. They may equally well be prepared by the direct esterification process in the presence of polycondensation catalysts, starting directly from the dicarboxylic acids and the diols.

According to the invention the COC-containing layer(s) comprises/comprise an amount of preferably not less than 2.0% by weight, in particular from 4 to 50% by weight and particularly preferably from 6 to 40% by weight, of a cycloolefin copolymer (COC), based on the weight of the layer provided with COC. It is very advantageous for the present invention if the cycloolefin copolymer (COC) used is not compatible with the thermoplastic polyester, e.g. polyethylene terephthalate, and does not form a homogeneous mixture with the same.

Cycloolefin polymers are generally homopolymers or copolymers which contain polymerized cycloolefin units and, if desired, acyclic olefins as comonomer. Cycloolefin polymers suitable for the present invention contain from 0.1 to 100% by weight, preferably from 10 to 99% by weight, particularly preferably from 50 to 95% by weight, of polymerized cycloolefin units in each case based on the total weight of the cycloolefin polymer. Particular preference is given to polymers which have been built up using the monomers comprising the cyclic olefins of the formulae I, II, III, IV, V or VI:

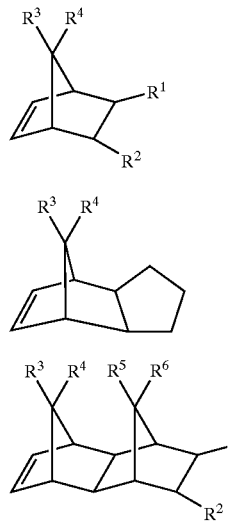

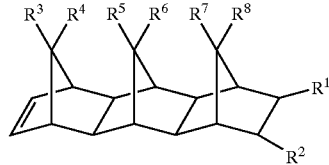

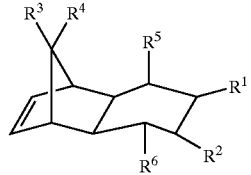

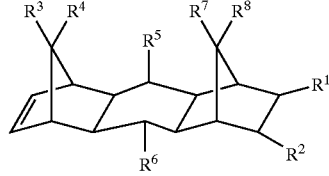

$R^1$, $R^2$, $R^3$, $R^4$, $R^5$, $R^6$, $R^7$ and $R^8$ in these formulae are independently of one another, identical or different and are a hydrogen atom or a $C_1$–$C_{30}$-hydrocarbon radical, or two or more of the radicals $R^1$ to $R^8$ have been bonded cyclically, and the same radicals in the different formulae may have the same or different meaning. Preferred $C_1$–$C_{30}$-hydrocarbon radicals are linear or branched $C_1$–$C_8$-alkyl radicals, $C_6$–$C_{18}$-aryl radicals, $C_7$–$C_{20}$-alkylenearyl radicals and cyclic $C_3$–$C_{20}$-alkyl radicals and acyclic $C_2$–$C_{20}$-alkenyl radicals.

If desired, the cycloolefin polymers of the invention may contain from 0 to 45% by weight, based on the total weight of the cycloolefin polymer, of polymerized units of at least one monocyclic olefin of the formula VII:

n here is a number from 2 to 10.

If desired, the cycloolefin polymers may contain from 0 to 99% by weight, based on the total weight bases on total weight of the cycloolefin polymer, of polymerized units of an acyclic olefin of the formula VIII:

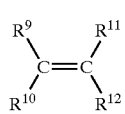

$R^9$, $R^{10}$, $R^{11}$ and $R^{12}$ here are, independently or one another, identical or different and are a hydrogen atom or a $C_1$–$C_{10}$-hydrocarbon radical, preferably a $C_1$–$C_8$-alkyl radical or a $C_6$–$C_{14}$-aryl radical.

Other polymers suitable in principle are cycloolefin polymers which are obtained by ring-opening polymerization of at least one of the monomers of the formulae I to VI, followed by hydrogenation.

Cycloolefin homopolymers have a structure composed of one monomer of the formulae I to VI. These cycloolefin polymers are less suitable for the purposes of the present invention. Polymers particularly suitable for the purposes of the present invention are cycloolefin copolymers (COC) which comprise at least one cycloolefin of the formulae I to VI and at least one comonomer. Preferred comononers are the acyclic olefins of the formula VIII. These cycloolefin copolymers which can be used according to the invention are termed COCs above and below. Acyclic olefins VIII preferred here are those which have from 2 to 20 carbon atoms, in particular unbranched acyclic olefins having from 2 to 10 carbon atoms, for example ethene, propene and/or butene. The proportion of polymerized units of acyclic olefins of the formula VIII is up to 99% by weight, preferably from 5 to 80% by weight, particularly preferably from 10 to 60% by weight, based on the total weight of the respective cycloolefin copolymer.

Among the cycloolefin copolymers, those which are particularly preferred contain polymerized units of polycyclic olefins having a fundamental norbornene structure, particularly preferably norbornene, 5-methylnorbornene or tetracyclododecene. Other suitable monomers are dimethyloctahydronaphthalene and cyclopentene. Particular preference is also given to cycloolefin copolymers (COCs) which contain polymerized units of acyclic olefins, in particular ethylene. Particular preference is, again, given to norbornene-ethylene copolymers and tetracyclododecene-ethylene copolymers which contain from 5 to 80% by weight, preferably from 10 to 60% by weight, of a cyclic olefin (based on the weight of the copolymer).

The cycloolefin polymers described generally have glass transition temperatures of from −20 to 400° C. Cycloolefin copolymers (COCs) which may preferably be used for the invention have a glass transition temperature above 70° C., preferably above 90° C. and in particular above 110° C. The viscosity number (decalin, 135° C., DIN 53 728) is advantageously from 0.1 to 200 ml/g, preferably from 50 to 150 ml/g.

The cycloolefin copolymers (COCs) are prepared by heterogeneous or homogeneous catalysis with organometallic compounds, as described in a wide variety of documents. Suitable catalyst systems based on mixed catalysts made from titanium compounds and, respectively, vanadium compounds in conjunction with aluminum organyl compounds are described in DD 109 224, DD 237 070 and EP-A-0 156 464. EP-A-0 283 164, EP-A-0 407 870, EP-A-0 485 893 and EP-A-0 503 422 describe the preparation of cycloolefin copolymers (COCs) with catalysts based on soluble metallocene complexes. The preparation processes described in the abovementioned specifications for cycloolefin polymers are expressly incorporated herein by way of reference.

The cycloolefin copolymers are incorporated into the film either in the form of pure granules or in the form of granulated concentrate (masterbatch), by premixing the polyester granules or polyester powder with the cycloolefin copolymer (COC) or, respectively, with the cycloolefin copolymer (COC) masterbatch, followed by feeding to an extruder. In the extruder the mixing of the components continues and they are heated to the processing temperature. It is advantageous here for the process of the invention if the extrusion temperature is above the glass transition temperature $T_g$ of the cycloolefin copolymer (COC), generally above the glass transition temperature of the cycloolefin copolymer (COC) by at least 5° C., preferably by from 10 to 180° C., in particular by from 15 to 150° C.

For the intermediate layers and for the outer layers it is possible in principle to use the polymers used for the base layer. The outer layers and, where appropriate, the intermediate layers may preferably be composed of a mixture of polymers or of a copolymer or of a homopolymer which comprise ethylene 2,6-naphthalate units and/or ethylene terephthalate units. Up to 30 mol % of the polymers may be composed of other comonomers (e.g. ethylene isophthalate units).

It is preferable for at least one outer layer not to comprise cycloolefin copolymer (COC). This outer layer is substantially composed of the thermoplastic polyesters mentioned and, where appropriate, has antiblocking agents and/or lubricants.

The base layer and the other layers may also comprise conventional additives, such as stabilizers and antiblocking agents. They are advantageously added to the polymer or, respectively, to the polymer mixture before melting begins. Examples of stabilizers used are phosphorus compounds, such as phosphoric acid or phosphoric esters.

Typical antiblocking agents (in this context also termed pigments) are inorganic and/or organic particles, such as calcium carbonate, amorphous silica, talc, magnesium carbonate, barium carbonate, calcium sulfate, barium sulfate, lithium phosphate, calcium phosphate, magnesium phosphate, aluminum oxide, lithium fluoride, the calcium, barium, zinc or manganese salts of the dicarboxylic acids used, carbon black, titanium dioxide, kaolin or crosslinked polymer particles, e.g. polystyrene particles or acrylate particles.

The additives selected may also comprise mixtures of two or more different antiblocking agents or mixtures of antiblocking agents of the same composition but different particle sizes. The particles may be added to the polymers of the individual layers of the film in the respective advantageous concentrations, e.g. as a glycolic dispersion during the polycondensation or via masterbatches during extrusion. Pigment concentrations which have proven particularly suitable are from 0 to 25% by weight (based on the weight of the respective layer). EP-A-0 602 964, for example, describes suitable antiblocking agents in detail.

Examples of suitable lubricants are polydimethylsiloxane, carboxylic acids, metal salts of carboxylic acids, carboxamides, carboxylic esters. An example of a detailed description is found in Kunststoff-Additive [Plastics Additives], 2nd edition, Carl Hanser Verlag, Munich, Vienna, pp. 309 to 347.

To improve the whiteness of the film the base layer and/or, where appropriate, another additional layer may comprise further pigmentation. It has proven particularly advantageous here for the additional materials added to be barium sulfate with a particle size of preferably from 0.3 to 0.8 µm, in particular from 0.4 to 0.7 µm, or titanium dioxide with a particle size of preferably from 0.05 to 0.3 µm. This gives the film a brilliant white appearance. The concentration of barium sulfate particles or titanium dioxide particles is preferably from 1 to 25% by weight, more preferably from 1 to 20% by weight, and very preferably from 1 to 15% by weight, based on the weight of the layer in which they are present.

The total thickness of the film may vary within wide limits and depends on the application envisaged. The preferred embodiments of the film of the invention have total thicknesses of from 4 to 500 µm, preferably from 8 to 300 µm, particularly preferably from 10 to 300 µm. The thickness of any intermediate layer(s) present is/are, in each case independently of one another, generally from 0.5 to 15 µm, preferably from 1 to 10 µm, in particular from 1 to 8 µm. All the values given are based on one intermediate layer. The thickness of the outer layer(s) is selected independently of the other layers and is preferably within the range from 0.1 to 10 µm, in particular from 0.2 to 5 µm, preferably from 0.3 to 2 µm, and outer layers applied on both sides may have identical or different thicknesses and compositions. The thickness of the base layer is therefore given by the difference between the total thickness of the film and the thickness of the outer and intermediate layer(s) applied, and, similarly to the total thickness, may therefore vary within wide limits.

The invention also provides a process for producing the polyester film of the invention by the coextrusion process known per se.

For the purposes of this process the procedure is to coextrude, through a flat-film die, the melts corresponding to the individual layers of the film, to draw off the resultant film on one or more roll(s) to solidify the film, then to stretch (orient) the film biaxially, to heat-set the biaxially stretched film, and, if desired, to corona- or flame-treat the surface layer intended for treatment.

The biaxial orientation procedure is generally carried out in sequence. For this, longitudinal orientation (i.e. in the machine direction=MD) is preferably the first procedure, followed by transverse orientation (i.e. perpendicularly to the machine direction=TD). This gives an orientation of the molecular chains. The longitudinal orientation procedure preferably takes place with the aid of two rolls running at different speeds corresponding to the stretching ratio desired. For the transverse stretching procedure an appropriate tenter frame is generally utilized.

The temperature at which the orientation procedure is carried out may vary within a relatively large range and depends on the film properties desired. The longitudinal stretching is generally carried out at from 80 to 130° C. and the transverse stretching at from 90 to 150° C. The longitudinal stretching ratio is generally within the range from 2.5:1 to 6:1, preferably from 3:1 to 5.5:1. The transverse stretching ratio is generally within the range from 3.0:1 to 5.0:1, preferably from 3.5:1 to 4.5:1.

In the heat-setting which follows, the film is held at a temperature of from 150 to 250° C. for from about 0.1 to 10 s. The film is then wound up in the usual manner.

To establish other desired properties, the film may be chemically treated or else corona- or, respectively, flame-treated. The intensity of treatment is to be selected such that the surface tension of the film is generally above 45 mN/m.

To establish other properties, the film may also be coated. Typical coatings have adhesion-promoting, antistatic, slip-improving or release action. It is clear that these additional coatings may be applied to the film by in-line coating using aqueous dispersions, prior to the transverse stretching procedure.

The particular advantage of the film of the invention is its high whiteness and high opacity, in combination with at least one high-gloss surface. The whiteness of the film is above 70%, preferably above 75% and particularly preferably above 80%. The opacity of the film of the invention is above 55%, preferably above 60% and particularly preferably above 65%. The gloss of the film of the invention is at least on one side above 100, preferably above 120, and particularly preferably above 130, using a measurement angle of 20° (DIN 67530).

Another advantage of the invention is that regenerated material produced directly during the production of the film can be reused at a concentration of from 10 to 70% by weight, based on the total weight of the film, without any significant adverse effect on the physical properties of the film. In particular, the regenerated material (composed essentially of polyester and cycloolefin copolymers (COCs)) does not give undefined changes in the color of the film, as is the case in the films of the prior art. The high-gloss outer layer is preferably kept free from regenerated material.

A further advantage of the invention is that the production costs of the film of the invention are comparable with those of conventional transparent films of the prior art. The other properties of the film of the invention relevant to its processing and use remain essentially unchanged or are even improved.

The film has very good suitability for interior decoration, for the construction of exhibition stands, for exhibition requisites, for protective coverings on machinery or on vehicles, and also for the packaging of foods or other consumable items which are sensitive to light and/or to air. It is also highly suitable for use in the industrial sector, e.g. for producing hot-stamping foils or as a label film. Besides this, the film is, of course, particularly suitable for image-recording papers, printed sheets, magnetic recording cards, to name just a few possible applications.

The processing performance and winding performance of the film, in particular on high-speed machines (winders, metalizers, printing machines and laminating machines), is exceptionally good. A measure of processing performance is the coefficient of friction of the film, which is below 0.6. A decisive factor affecting winding performance, besides a good thickness profile, excellent layflat and a low coefficient of friction, is the roughness of the film. It has become apparent that the winding of the film of the invention is particularly good if the average roughness is within a range from 50 to 250 nm while the other properties are complied with. The roughness may be varied within the stated range by, inter alia, varying the COC concentration, the outer layer thickness, and where appropriate the mixing specification for the outer layer, and the process parameters in the production process.

The following parameters were used to describe the polymers and the films:
DIN=Deutsches Institut fur Normung [German Institute for Standards]
ISO=International Organization for Standardization
ASTM=American Society for Testing and Materials
SV (standard Viscosity)

Standard viscosity Sv (DCA) is determined in dichloroacetic acid by a method based on DIN 53726.

Intrinsic viscosity (IV) is calculated as follows from standard viscosity $$IV(DCA)=6.67 \cdot 10^{-4} \, SV(DCA)+0.118$$

Coefficient of Friction

Coefficient of friction was determined to DIN 53 375. The coefficient of sliding friction was measured 14 days after production.

Surface Tension

Surface tension was determined by the ink method (DIN 53 364).

Roughness

Roughness $R_a$ of the film was determined to DIN 4768 with a cut-off of 0.25 mm.

Whiteness and Opacity

Whiteness and opacity were determined with the aid of a Zeiss, Oberkochem (DE) "ELREPHO" reflectance photometer, standard illuminant C, 2° C. normal observer. Opacity is determined to DIN 53 146. Whiteness is defined as W=RY+3RZ−3RX.

W=whiteness, RY, RZ and RX=relevant reflection factors when the Y, Z and X color-measurement filter is used. The white standard used was a barium sulfate pressing (DIN 5033, Part 9). A detailed description is given, for example, in Hansl Loos "Farbmessung", Verlag Beruf und Schule, Itzehoe (1989).

Light Transmittance

Light transmittance is measured using a method based on ASTM-D 1033-77.

Gloss

Gloss was determined to DIN 67 530 with measurement angle 20°. Reflectance was measured as an optical value characteristic of a film surface. A beam of light hits the flat test surface at the set angle of incidence and is reflected and/or scattered by this surface. A proportional electrical variable is displayed representing light rays hitting the photoelectronic detector. The value measured is dimensionless and must be stated together with the angle of incidence.

Glass Transition Temperature

Glass transition temperature Tg was determined using film specimens with the aid of DSC (differential scanning calorimetry) (DIN 73 765). A DuPont DSC 1090 was used. The heating rate was 20 K/min and the specimen weight was about 12 mg. The glass transition Tg was determined in the first heating procedure. Many of the specimens showed an enthalpy relaxation (a peak) at the beginning of the step-like glass transition. The temperature taken as Tg was that at which the step-like change in heat capacity—without reference to the peak-shaped enthalpy relaxation—achieved half of its height in the first heating procedure. In all cases, there was only a single glass transition observed in the thermogram in the first heating procedure.

The examples below serve for further description of the invention. Coextruded multilayered films are used.

EXAMPLE 1

A film of thickness 23 μm with layer sequence A-B-A is produced using coextrusion technology, B being the base layer and A being the outer layers. The thickness of the base layer B is 21 μm, and the thickness of each of the two outer layers covering the base layer is 1 μm. Chips of polyethylene terephthalate (prepared by the transesterification process using Mn as transesterification catalyst, Mn concentration: 100 ppm) were dried at 150° C. to residual moisture below 100 ppm and fed to the extruder for the base layer B. Alongside this, chips of ®Topas 6015 cycloolefin copolymer (COC) from Ticona (COC composed of 2-norbornene and ethylene, see also W. Hatke: Folien aus COC [COC Films], Kunststoffe 87 (1997) 1, pp. 58–62) with a glass transition temperature Tg of 170° C. were also fed to the extruder for the base layer B. The proportion of the cycloolefin copolymer (COC) in the base layer was 10% by weight.

The outer layers of thickness 1 μm comprise 93% of polyester (RT49, Kosa, Germany), and 7% of a masterbatch which comprises, besides polyester, 10 000 ppm of silicon dioxide (®Sylobloc, Grace, Germany).

Coextrusion followed by a stepwise orientation procedure in longitudinal and transverse directions was used to produce a white, opaque three-layer film with a total thickness of 23 μm.

Base Layer B was a Mixture of:

| 90.0% by weight | of polyethylene terephthalate homopolymer (RT49, Kosa, Germany) |
| 10.0% by weight | of Topas ® 6015 cycloolefin copolymer (COC) from Ticona, Germany |

The process conditions in the individual steps were:

| Extrusion: | Temperatures for base layer and outer layer: | 280° C. |
| | Temperature of take-off roll: | 30° C. |
| Longitudinal stretching: | Temperature: | 80–125° C. |
| | Longitudinal stretching ratio: | 4.2 |
| Transverse stretching: | Temperature: | 80–135° C. |
| | Transverse stretching ratio: | 4.0 |
| Setting: | Temperature: | 230° C. |
| | Duration: | 3 s |

The film had the good properties required and the desired handling and processing performance. The properties achieved in films produced in this way are given in table 2.

EXAMPLE 2

Unlike in example 1, 50% by weight of regenerated material was now added to the base layer. The concentration of the cycloolefin copolymer (COC) in the film thus produced was again 10% by weight. The process parameters were unchanged from example 1. A visual observation was made of any yellow discoloration of the film. Table 2 shows that hardly any yellow discoloration of the film could be seen.

Base Layer B was a Mixture of:

| 45.0% by weight | of polyethylene terephthalate homopolymer (RT49, Kosa, Germany) |
| 50.0% by weight | of regenerated material (90% by weight of polyester + 10% by weight of Topas 6015) and |
| 5.0% by weight | of Topas ® 6015 cycloolefin copolymer (COC) from Ticona |
| Outer layers: | as in example 1. |

EXAMPLE 3

Unlike in example 1, the ABA film now produced had a thickness of 96 μm, the base layer of thickness 92 xm being covered by outer layers each of thickness 2 μm. The concentration of the cycloolefin (COC) in the base layer was 8% by weight. The process parameters were unchanged from example 1. A visual observation was made of any yellow discoloration of the film. Table 2 shows that no yellow discoloration of the film could be seen.

Base Layer B (92 μm) was a Mixture of:

| 92.0% by weight | of polyethylene terephthalate homopolymer (RT49, Kosa, Germany) |
| 8.0% by weight | of Topas ® 6015 cycloolefin copolymer (COC) from Ticona |
| Outer layers: | as in example 1. However, the thickness of the outer layers is 2 μm. |

EXAMPLE 4

Unlike in example 3, 50% by weight of regenerated material was now added to the base. The concentration of the cycloolefin copolymer (COC) in the base layer was again 8% by weight. The process parameters remained unchanged from example 1. A visual observation was made of any yellow discoloration of the film. Table 2 shows that hardly any yellow discoloration of the film could be seen.

Base Layer B was a Mixture of:

| 47.0% by weight | of polyethylene terephthalate homopolymer (RT49, Kosa, Germany) |
| 50.0% by weight | of the regenerated material from the same process (90% by weight of polyester + 10% by weight of Topas 6015) and |
| 3.0% by weight | of Topas ® 6015 cycloolefin copolymer (COC) from Ticona |
| Outer layers: | as in example 3. |

COMPARATIVE EXAMPLE 1

Example 1 from DE-A 2 353 347 was repeated. The example was modified by additionally including 50% by weight of regenerated material in the process. Table 2 shows that a marked yellow discoloration of the film could be seen.

In addition, the roughness of the film is too high for many applications and its gloss is too low for many applications.

Base Layer B was a Mixture of:

| | |
|---|---|
| 47.5% by weight | of polyethylene terephthalate homopolymer (RT49, Kosa, Germany) |
| 50.0% by weight | of regenerated material from the same process (95% by weight of polyester + 5% by weight of polypropylene) and |
| 2.5% by weight | of polypropylene |

COMPARATIVE EXAMPLE 2

Example 1 from EP-A 0 300 060 was repeated. The example was modified by additionally including 50% by weight of regenerated material in the process. Table 2 shows that a marked yellow discoloration of the film could be seen. In addition, the roughness of the film is too high for many applications and its gloss is too low for many applications.

Base Layer B was a Mixture of:

| | |
|---|---|
| 45.0% by weight | of polyethylene terephthalate homopolymer (RT49, Kosa, Germany) |
| 50.0% by weight | of regenerated material from the same process (90% by weight of polyester + 10% by weight of polypropylene) and |
| 5.0% by weight | of polypropylene |

COMPARATIVE EXAMPLE 3

Example 1 from EP-A 0 360 201 was repeated. The example was modified by additionally including 50% by weight of regenerated material in the process. Table 2 shows that a marked yellow discoloration of the film could be seen. In addition, the roughness of the film is too high for many applications and its gloss is too low for many applications.

Base Layer B was a Mixture of:

| | |
|---|---|
| 40.0% by weight | of polyethylene terephthalate homopolymer (RT49, Kosa, Germany) |
| 50.0% by weight | of regenerated material from the same process (80% by weight of polyester + 20% by weight of polypropylene) and |
| 10.0% by weight | of polypropylene |

COMPARATIVE EXAMPLE 4

Example 1 from DE-A 195 40 277 was repeated. The example was modified by additionally including 50% by weight of regenerated material in the process. Table 2 shows that a marked yellow discoloration of the film could be seen. In addition, the roughness of the film is much too high for many applications and its gloss is too low for many applications.

Base Layer B was a Mixture of:

| | |
|---|---|
| 43.5% by weight | of polyethylene terephthalate homopolymer (RT49, Kosa, Germany) |
| 50.0% by weight | of regenerated material from the same process (87% by weight of polyester + 13% by weight of polystyrene) and |
| 6.5% by weight | of polystyrene |

TABLE 2

| Example | Film thickness μm | Layer structure | Additive of polyester | Glass temperature °C. | White-ness % | Opacity % | Assessment of film yellowness | Gloss (measurement angle 20°) | Coefficient of friction COF Outside with respect to inside | Average roughness $R_a$ Outside | Inside |
|---|---|---|---|---|---|---|---|---|---|---|---|
| E1 | 23 | ABA | COC | 170 | 75 | 75 | ++ | 180 | 0.49 | 45 | 48 |
| E2 | 23 | ABA | COC | 170 | 76 | 80 | + | 190 | 0.42 | 44 | 46 |
| E3 | 96 | ABA | COC | 170 | 85 | 85 | ++ | 195 | 0.32 | 39 | 40 |
| E4 | 96 | ABA | COC | 170 | 86 | 90 | + | 190 | 0.35 | 37 | 38 |
| CE1 | 155 | B | Polypropylene | −10 | 80 | 70 | − | 46 | 0.45 | 410 | 410 |
| CE2 | 100 | B | Polypropylene | −10 | 88 | 80 | − | 57 | 0.45 | 180 | 180 |
| CE3 | 100 | ABA | Polypropylene | −10 | 92 | 89 | − | 54 | 0.25 | 370 | 370 |
| CE4 | 125 | B | Polystyrene | 100 | 82 | 82 | − | 51 | 0.35 | 480 | 480 |

Key to yellowness in films produced:
++ no yellowing detectable
+ slight yellow coloration detectable
− marked yellow coloration detectable
CE comparative example

What is claimed is:

1. A polyester film which has at least one base layer (B) and at least one outer layer, wherein at least the base layer comprises a thermoplastic polyester and a cycloolefin copolymer (COC) and COC is absent from said outer layer, said outer layer further comprising at least one antiblocking agent and having a thickness ranging from 0.1 to 10 microns, said outer layer exhibiting a surface gloss above 130 and a coefficient of friction of less than 0.6, wherein the opacity of said film is greater than 55%.

2. The polyester film as claimed in claim 1, which has an A-B-C layer structure, wherein the outer layers A and C are identical or different, and wherein at least one of the outer layers no COC is present.

3. The polyester film as claimed in claim 1, which has at least one intermediate layer.

4. The polyester film as claimed in claim 1, wherein the thermoplastic polyester contains ethylene glycol units and terephthalic acid units, or ethylene glycol units and naphthalene-2,6-dicarboxylic acid units.

5. The polyester film as claimed in claim 4, wherein the thermoplastic polyester is polyethylene terephthalate.

6. The polyester film as claimed in claims 1, wherein the layers provided with the COC comprise from about 2 to about 60% by weight, of the COC, based in each case on the weight of the layers provided with the same.

7. The polyester film as claimed in claim 1, wherein the COC comprises polynorbornene, polytetracyclododecene, polydimethyloctahydronaphthalene, polycyclopentene or poly-5-methylnorbornene.

8. The polyester film as claimed in claim 1, wherein the COC contains, a comonomer selected from the group consisting of, ethylene, propylene, and butylene.

9. The polyester film as claimed in claim 1, wherein the COC is a norbomene-ethylene or tetracyclododecene-ethylene copolymer.

10. The polyester film as claimed in claim 1, wherein the COC has a glass transition temperature of from 70 to 270° C.

11. The polyester film as claimed in claim 1, which has a whiteness above 70%.

12. The polyester film as claimed in claim 1, which also comprises conventional additives.

13. A process for producing the polyester film as claimed in claim 1, which comprises flat-film die coextruding the starting materials required for producing the base and outer layers and any intermediate layers present, through a flat-film die and biaxially orienting and heat-setting the resultant film.

14. A method of making a molding which method comprises transforming a polyester film as claimed in claim 1 into a molding.

15. A molding produced according to the method of claim 14.

* * * * *